Patented Aug. 28, 1951

UNITED STATES PATENT OFFICE 2,566,226

METHOD FOR PRODUCING SUBSTITUTED MELAMINES

Johnstone S. Mackay, Old Greenwich, and Joseph H. Paden, Stamford, Conn., assignors to American Cyanamid Company, New York, N. Y., a corporation of Maine No Drawing. Application May 1, 1947, Serial No. 745,247

8 Claims. (Cl. 260—249.6)

The present invention relates to the preparation of substituted melamines by heating an hydroxy triazine with a primary or secondary amine.

An object of this invention is to prepare substituted melamines by an economical process involving only simple apparatus and procedures.

Another object of this invention is to prepare substituted melamines by treating an hydroxy triazine with a primary or secondary, alkyl or aryl amine.

Still another object of the invention is to prepare such substituted melamines by simply heating an hydroxy triazine with such an amine at somewhat elevated temperatures in a closed reaction vessel.

Other objects of the invention will be apparent from the discussion that follows hereinafter.

In U. S. Serial No. 508,246, filed October 29, 1943, the present applicants disclose a process for preparing melamine by heating an hydroxy triazine such as cyanuric acid, ammelide, and ammeline, in the presence of ammonia at a temperature of at least 300° C. in a closed reactor. In carrying out the process therein described, somewhat longer periods of heating are required to obtain maximum yields of melamine at temperatures of about 300° C., whereas shorter heating periods are shown to provide higher yields at temperatures of the order of 350°–450° C. so that the latter range is preferred. However, temperatures above this range may also be employed, if desired, those above 500° C. being suitable especially when the heating period is not unduly extended.

It has now been discovered that substituted melamines may be prepared by heating such hydroxy triazines as those aforementioned with a primary or secondary, alkyl or aryl amine at a temperature of at least 300° C., preferably at a temperature within the range of 350°–450° C., in a closed reaction vessel. Such substituted melamines are shown graphically by the following general formula:

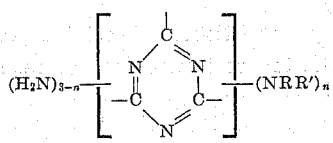

In the above formula $n$ represents an integer and is at least 1 and not more than 3, R represents an alkyl or aryl radical and R' represents hydrogen, or an alkyl or aryl radical.

Illustrative examples of such radicals that R and R' may represent are: alkyl, e. g., methyl, ethyl, propyl, isopropyl, allyl, butyl, secondary butyl, crotyl, methallyl, ethallyl, heptyl, isoheptyl, octyl, decyl, isoamyl, octadecyl, and the like, including cycloalkyl, or alicyclic, e. g., cyclopentyl, cyclopentenyl, cyclohexyl, cyclohexenyl, cycloheptyl and the like, and also aryl-substituted alkyl, e. g., benzyl, phenylethyl, phenylisopropyl, cinnamyl, and the like; aryl, e. g., phenyl, diphenyl, naphthyl, and the like including alkyl substituted aryl, e. g., tolyl, xylyl, methylphenyl, ethylphenyl, propylphenyl, allylphenyl, 2-butenylphenyl, and the like; and their homologues.

When cyanuric acid is heated with a primary amine the melamine so produced is mainly an NN'N''-trisubstituted melamine, whereas when the amine employed is a secondary amine the melamine obtained is mainly an NN'N''-hexasubstituted melamine. Similarly, when ammelide is heated with a primary or secondary amine an NN'-disubstituted melamine or an NN'-tetrasubstituted melamine, respectively, mainly results, whereas heating ammeline with such an amine provides mainly an N-monosubstituted melamine or an N-disubstituted melamine, respectively. For example, heating 42 g. of ammeline with 25 g. of n-butyl amine in a 300 cc. autoclave at 350° C. for 2 hours results in the production of 7.6 g. of N-monobutyl melamine. In this experiment a small amount of NN'-dibutyl melamine is also produced. In another experiment 43 g. of ammelide were heated with 50 g. of n-butyl amine in a 300 cc. autoclave at 350° C. for 2 hours to obtain a mixture of 21.2 g. of butyl melamines. From this mixture there were obtained 8.4 g. of N-monobutyl melamine, 9.0 g. of NN'-dibutyl melamine and 3.7 g. of NN'N''-tributyl melamine using one of the methods of separation hereinafter described. In another experiment 42 g. of ammeline were heated with 31 g. of aniline in a 300 cc. autoclave at 350° C. for 2 hours to provide 24.1 g. of phenyl melamines which was mainly all N-monophenyl melamine. In still another experiment 44 g. of cyanuric acid and 95 g. of aniline were heated in a 300 cc. autoclave at 400° C. for 2 hours to provide about 15 g. of NN'N''-triphenyl melamine.

Illustrative examples of primary and secondary amines that may be used in practicing the invention are: aniline, octyl amine, methyl amine, dimethyl amine, ethyl amine, methyl ethyl amine, di-ethyl amine, propyl amine, isopropyl amine, di-propyl amine, allyl amine, di-isopropyl amine, methyl propyl amine, ethyl propyl amine, crotyl amine, butyl amine, isobutyl amine, secondary butyl amine, di-butyl amine, butyl ethyl amine, decyl amine, octadecyl amine, cyclohexyl amine, cyclopentyl amine, cyclohexenyl amine, pentyl amine, para-chloroaniline, toluidine, xylidine, N-methyl aniline, benzyl amine, allylphenyl amine, naphthyl amine, phenethyl amine, ethylphenyl amine, N-butyl toluidine and the like.

While the separation of melamine from reaction mixtures in which none of the alkyl or aryl substituted melamines are present may be readily effected by simply extracting with hot water, the separation is somewhat complicated when such substituted melamines are present. Generally, the alkyl substituted melamines are selectively extracted away from melamine with an alcohol such as ethanol or n-butanol. The N-alkyl melamines, being less soluble in such alcohols, are separated from the more highly substituted alkyl melamines by fractional crystallization. The NN'- and NN'N''-alkyl substituted melamines are separated from each other on the basis of the relatively greater solubility of the hydrochlorides of the former in ethyl ether. Alternatively, such a reaction mixture may be extracted with ethyl ether to remove such NN'- and NN'N''-alkyl substituted melamines, and thereafter the residue from this extraction may be extracted with ethanol to remove such N-alkyl substituted melamines, leaving melamine as the residue. With the aryl substituted melamines, dioxane may be employed to separate such substituted melamines from the melamine. The aryl substituted melamines are recovered by removing the dioxane, and the dry mixture thereof is extracted with an alcohol such as ethanol, n-butanol and the like to remove the N-aryl substituted melamines. The residue of NN'- and NN'N''-aryl substituted melamines from the alcohol extraction is then separated by converting such melamines to the corresponding hydrochlorides, that of the NN'-aryl substituted melamines being soluble in water while that of the NN'N''-aryl substituted melamines is substantially insoluble.

While the present invention has been described with particular reference to specific embodiments, it is to be understood that it is not to be limited thereto but is to be construed broadly and restricted solely by the scope of the appended claims.

What is claimed is:

1. A method of preparing a substituted melamine of the formula

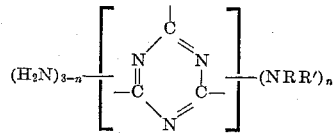

where $n$ is an integer and is at least 1 and not more than 3, R is a member of the group consisting of alkyl and aryl radicals and R' is a member of the group consisting of hydrogen, alkyl and aryl radicals, said method comprising heating an hydroxy triazine with a member of the group consisting of primary and secondary, alkyl and aryl amines at a temperature of at least 300° C. in a closed reaction vessel.

2. A method of preparing a substituted melamine of the formula

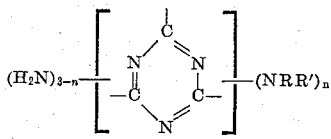

where $n$ is an integer and is at least 1 and not more than 3, R is a member of the group consisting of alkyl and aryl radicals and R' is a member of the group consisting of hydrogen, alkyl and aryl radicals, said method comprising heating an hydroxy triazine with a member of the group consisting of primary and secondary, alkyl and aryl amines at a temperature within the range of 350°–450° C. in a closed reaction vessel.

3. A method of preparing a substituted melamine of the formula

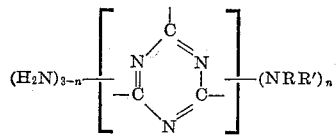

where $n$ is an integer and is at least 1 and not more than 3, R is a member of the group consisting of alkyl and aryl radicals and R' is a member of the group consisting of hydrogen, alkyl and aryl radicals, said method comprising heating cyanuric acid with a member of the group consisting of primary and secondary, alkyl and aryl amines at a temperature within the range of 350°–450° C. in a closed reaction vessel.

4. A method of preparing a substituted malamine of the formula

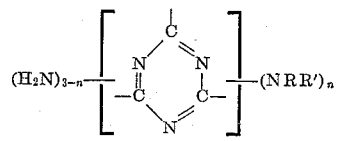

where $n$ is an integer and is at least 1 and not more than 3, R is a member of the group consisting of alkyl and aryl radicals and R' is a member of the group consisting of hydrogen, alkyl and aryl radicals, said method comprising heating ammelide with a member of the group consisting of primary and secondary, alkyl and aryl amines at a temperature within the range of 350°–450° C. in a closed reaction vessel.

5. A method of preparing a substituted melamine of the formula

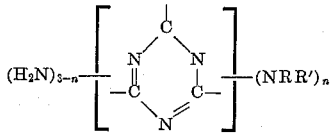

where $n$ is an integer and is at least 1 and not more than 3, R is a member of the group consisting of alkyl and aryl radicals and R' is a member of the group consisting of hydrogen, alkyl and aryl radicals, said method comprising heating ammeline with a member of the group consisting of primary and secondary, alkyl and aryl amines at a temperature within the range of 350°–450° C. in a closed reaction vessel.

6. The method of claim 3 in which the amine employed is aniline.

7. The method of claim 4 in which the amine employed is n-butyl amine.

8. The method of claim 5 in which the amine employed is n-butyl amine.

JOHNSTONE S. MACKAY.
JOSEPH H. PADEN.

REFERENCES CITED

The following references are of record in the file of this patent:

UNITED STATES PATENTS

| Number | Name | Date |
|---|---|---|
| 2,222,350 | Keller | Nov. 19, 1940 |
| 2,396,193 | Paden | Mar. 5, 1946 |

FOREIGN PATENTS

| Number | Country | Date |
|---|---|---|
| 583,504 | Great Britain | Dec. 19, 1946 |

OTHER REFERENCES

Karrer: "Organic Chemistry," 2nd ed., page 119.